G. A. WOOD.
GEAR PUMP.
APPLICATION FILED MAR. 15, 1915.
1,271,968.
Patented July 9, 1918.
2 SHEETS—SHEET 1.
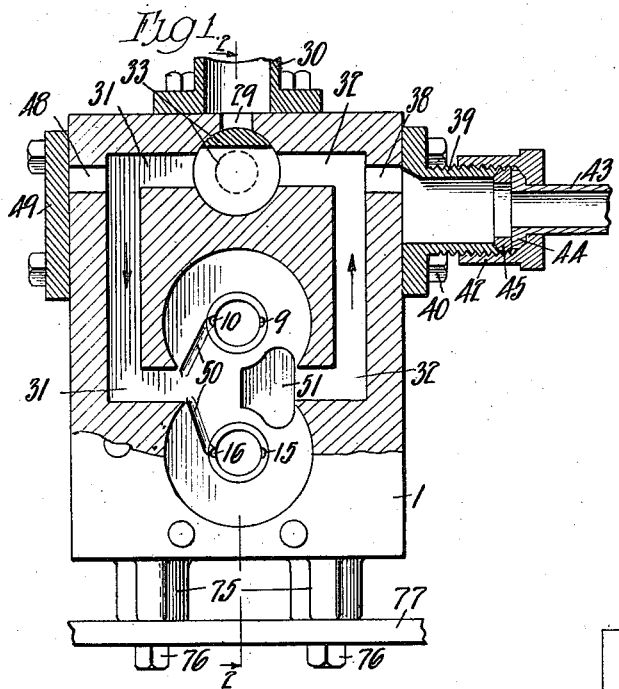
Fig 1.
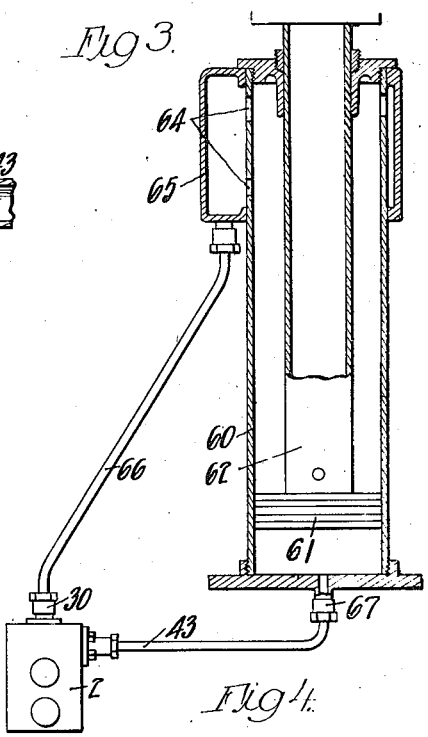
Fig 3.
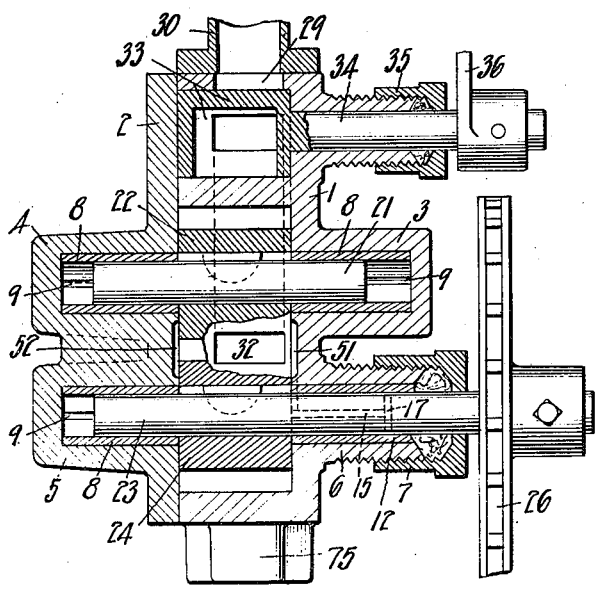
Fig 2.
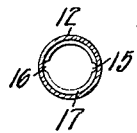
Fig 4.
Fig 5.
Witnesses
E. H. Barrett
H. W. Kreinbring
Inventor
Garfield A. Wood,
by
Pagelsen & Spencer,
Attys.

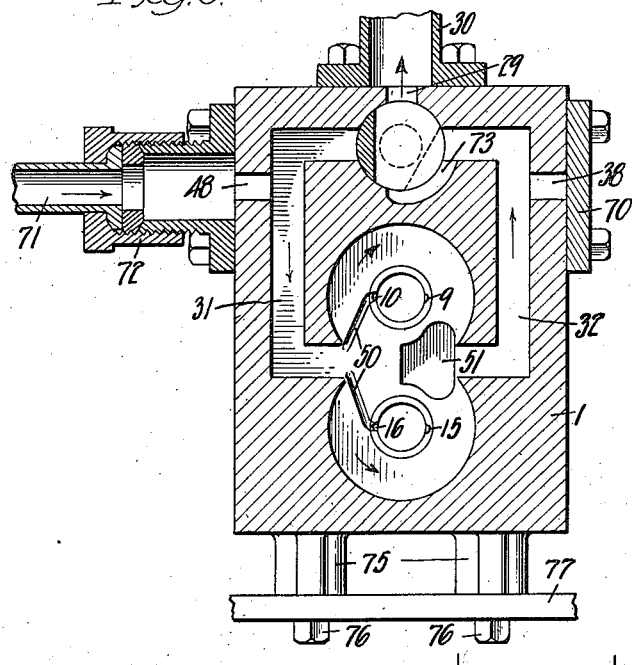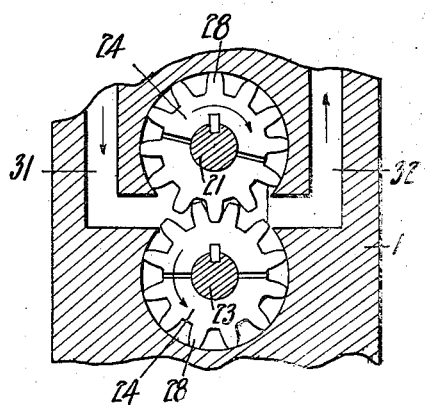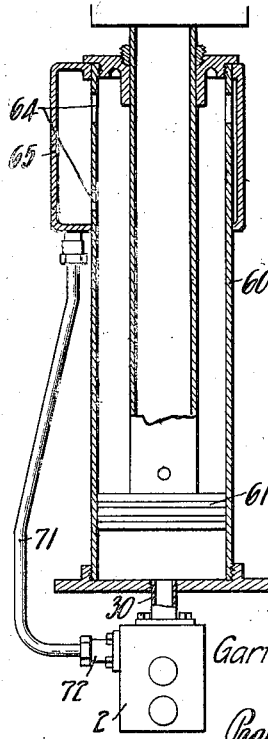

UNITED STATES PATENT OFFICE.

GARFIELD A. WOOD, OF DETROIT, MICHIGAN.

GEAR-PUMP.

1,271,968.     Specification of Letters Patent.     Patented July 9, 1918.

Application filed March 15, 1915. Serial No. 14,479.

*To all whom it may concern:*

Be it known that I, GARFIELD A. WOOD, a citizen of the United States, and a resident of Detroit, in the county of Wayne and State of Michigan, have invented a new and Improved Gear-Pump, of which the following is a specification.

In the use of gear oil pumps, much difficulty is experienced due to the fact that the pressure of the liquid becomes equalized on all parts of the gear shaft bearings, thus preventing circulation and causing them to run dry; and, in high pressure installations, leakage is very apt to occur at any point where one of the shafts passes through the pump casing. One object of the present invention is to provide a passage or passages leading from the suction side of the pump to the vicinity of the outer ends of the bearings, whereby a constant circulation of liquid through the bearings is insured, and whereby, in those instances in which the shaft passes through the casing, leakage is prevented. Another object of the present invention is to provide, within the pump casing, means whereby the liquid may be drawn from a reservoir and delivered through the gears to a pressure chamber, or may be by-passed from the pressure chamber back to the reservoir, or may be circulated in the casing itself at will, the pump running continuously if desired. The invention also includes the use of passages and valve means of such nature that, even with a constantly running pump, all possibility of the valve means being so manipulated as to suddenly cut off the discharge passage is eliminated.

The nature of the invention will more fully appear from the description and appended drawings, wherein two embodiments are shown.

In the drawings, Figure 1 is a side view of one embodiment of my invention, parts being broken away and the gears and gear shafts being removed. Fig. 2 is a section on the line 2—2 of Fig. 1. Fig. 3 is a diagrammatic sketch showing one manner of connecting the pump to a hoisting device. Fig. 4 is a longitudinal section through a bushing for the bearing in which the projecting end of the driving shaft is supported. Fig. 5 is a section on the line 5—5 of Fig. 4. Fig. 6 is a vertical section through a modified form of pump, the gears being removed. Fig. 7 is a fragmentary section showing the gears and adjacent passages. Fig. 8 is a sketch showing a preferred manner of connecting the modified form of pump to a hoisting mechanism.

In the embodiment of my invention shown in Figs. 1 to 5, inclusive, the body 1 of the pump casing, and the cover 2 together form a block (as shown, rectangular, but the shape may be varied) and are provided with the alined bearing boxes 3 and 4 for the driven pump gear, and with the alined bearing boxes 5 and 6 for the driving gear, the three first mentioned boxes being closed at their outer ends, and the box 6 being threaded to receive the stuffing box 7 of ordinary construction. The boxes 3, 4 and 5 are lined with the bushings 8, each of which has a longitudinal oil admission groove 9 formed in its inner surface and a similar oil exit passage 10 on the side opposite the inlet groove; and the box 6 is lined with a bushing 12 having an oil inlet groove 15 and an exit groove 16 that may be diametrically related to each other. The last mentioned grooves preferably terminate slightly inwardly from the outer edge of the bushing and are joined by the circumferential groove 17. The inlet passages 9 and 15 may be omitted in certain instances as in high pressure pumps the leakage through the bearing is sufficient to accomplish the purpose.

Mounted in the oppositely located bushings 8 is a shaft 21 upon which is keyed the driven gear 22 of the pump; and the third bushing 8, together with the bushing 12, supports the driving shaft 23 to which the driving pump gear 24 is keyed. The shaft 23 extends outwardly through the stuffing box 7 and receives its torque from a sprocket wheel 26, or other preferred element. It will be seen that the shafts 21 and 23 terminate some distance from the outer walls of the bearing boxes 3, 4 and 5; the spaces between the ends of the shafts and the walls of the boxes therefore constitute passages for oil from the admission to the exit grooves.

Each of the pump gears includes the usual gear teeth 28, and is of a length to fit closely between the body 1 and cover 2 of the pump casing, and, in operation, turns in the direction indicated by the arrows in Fig. 7. The body of the casing is provided with the intake passage 29, to which liquid may be brought through the nipple 30 and from which branch the feed passage 31 and the discharge passage 32 that lead, respectively, to the suction and pressure sides of the gears; and at the intersection of the three passages a three-way valve 33 is interposed, the valve shaft 34 of which passes through the stuffing box 35 and has secured thereto the operating lever 36. The discharge passage 32 also leads through an opening 38 to a nipple 39 secured in place by the bolts 40 and having threaded thereon the perforated cap 42 by which a connection may be made to the discharge pipe 43, having the annular flange 44 around its inner end. A jamb washer 45 may be interposed between the end of the nipple and the discharge pipe, if desired. The intake passage may also have an opening 48 (closed in the present embodiment by the plate 49), the function of which will appear later.

In order to connect the grooves 10 and 16 to the suction passage 31, the body 1 is grooved as indicated at 50 (Fig. 1), and the cover 2 is provided with similar grooves (not shown); and the body and cover are milled out or grooved at 51 and 52, respectively, to allow the escape of liquid from the end of the gears as the teeth 28 engage with each other, whereby locking of the gears is avoided.

The present invention, while of general utility for pumping purposes, is particularly suitable for use in connection with a fixed hoisting cylinder 60 (Fig. 3) and movable piston 61 of an automobile truck, the space between the piston rod 62 and the cylinder 60 being utilized for storage, and being in communication with the nipple 30 through the passages 64, jacket 65 and pipe 66. The discharge pipe 43 is connected to the lower end of the cylinder at 67. Consequently, with the motor continually running, the valve 33 may be turned (1st) so that liquid will be sucked from the upper side of the piston and delivered to the lower side thereof to hoist a load, or (2nd) so that the weight on the piston will force the liquid in the reverse direction (by-passing the pump gears), or (3rd) so that a continual circulation of the liquid will take place within the pump casing, as shown in Fig. 1.

The modification shown in Fig. 6 differs from that heretofore described in that the passage 38 is closed by a plate 70, the passage 48 being connected to an intake pipe 71 by means of the gland or nipple 72. In this instance the liquid is discharged through the nipple 30, which, it will be remembered, constitutes an intake passage in the embodiment first described. The modified pump may be conveniently installed in respect to the hoisting device as shown in Fig. 8.

The pump shown in Fig. 6 also differs from that previously described in this important particular:—it is provided with a port 73 of such length as to prevent an entire closure of the passage 32. Consequently, sudden shocks on the constantly running pump gears through mistakes in the manipulation of the valve are rendered impossible, since the liquid may always escape into the cylinder 60 or into the suction passage 31. Besides assuming the position just mentioned, the valve, as before, may close the passage between the intake and discharge conduits, in which case the liquid is discharged as fast as received; it may close the discharge passage 29, thus causing a constant circulation within the pump casing; or it may partly close the connection between the intake and discharge passages to vary the rate of pumping. The pump shown in Fig. 1 may of course be provided with a port similar to 73.

In either instance the pump may have lugs 75 for the reception of bolts 76, whereby it may be attached to any desired support 77.

It is clear that many changes may be made in the details of construction without departing from the spirit of my invention. I do not, therefore, wish to be limited otherwise that as indicated by the subjoined claims.

I claim:—

1. A device for handling liquid comprising a closed system including a casing, the capacity of the casing being but a small fraction of that of the closed system as a whole, a pair of meshing pump gears chambered therein, said casing having a continuous passage, other than the gear chamber extending from the delivery side of the pump gears to the suction side thereof, said casing also having two openings leading to the passage, and valve means whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired, said valve means and the associated passages being so arranged that the valve means is incapable of entirely preventing the escape of liquid from the discharge side of the pump gears.

2. A device for handling liquid comprising a closed system including a casing, the capacity of the casing being but a small fraction of that of the closed system as a whole, a pair of meshing pump gears chambered therein, said casing having a continuous passage, other than the gear chamber extending from the delivery side of the pump gears to the suction side thereof, said casing also having two openings leading to the passage, and valve means whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired, and means for preventing the valve means from entirely obstructing the flow of liquid from the discharge passage, whereby sudden shocks on the pump gears are avoided.

3. A device for handling liquid comprising a closed system including a casing, the capacity of the casing being but a small fraction of that of the closed system as a whole, a pair of meshing pump gears chambered therein, said casing having a continuous passage other than the gear chamber extending from the delivery side of the pump gears to the suction side thereof, said casing also having two openings leading to the passage, and valve means inclosed by said casing whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired, said valve means and the associated passages being so arranged that the valve means is incapable of entirely preventing the escape of liquid from the discharge side of the pump gears.

4. A device for handling liquid comprising a closed system including a casing, the capacity of the casing being but a small fraction of that of the closed system as a whole, a pair of meshing pump gears chambered therein, said casing having a continuous passage other than the gear chamber extending from the delivery side of the pump gears to the suction side thereof, said casing also having two openings leading to the passage, and valve means inclosed by said casing whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired, and means for preventing the valve means from entirely obstructing the flow of liquid from the discharge passage, whereby sudden shocks on the pump gears are avoided.

5. A device for handling liquid comprising a casing, a pair of meshing pump gears chambered therein, said casing having a continuous passage, other than the gear chamber extending from the delivery side of the pump gears to the suction side thereof, said casing having three openings leading thereto; a plate for closing either one of two of the openings, and valve means whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears.

6. A device for handling liquid comprising a closed system including a casing, the capacity of the casing being but a small fraction of that of the closed system as a whole, a pair of meshing pump gears chambered therein, said casing having a continuous passage other than the gear chamber extending from the delivery side of the pump gears to the suction side thereof, said casing also having two openings leading to the passage, and valve means whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired, said casing having an unobstructed by-pass formed therein opposite the valve means whereby the latter is prevented from entirely obstructing the flow of liquid from the discharge passage.

7. A device for handling liquid comprising a closed system including a casing, the capacity of the casing being but a small fraction of that of the closed system as a whole, a pair of meshing pump gears chambered therein, said casing having a continuous passage extending from the delivery side of the pump gears to the suction side thereof, said passage lying substantially in the plane of the gears, said casing also having two openings leading to the passage, and valve means whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears.

8. In combination with a fixed hoisting cylinder and a piston and piston rod movable up and down therein, a casing, a pair of meshing pump gears chambered therein, said casing having a continuous passage other than the gear chamber extending from the delivery side of the pump gears to the suction side thereof, said casing also having two openings leading to the passage, passage forming means leading from one of the openings to a point in the cylinder beneath the piston, other passage forming means leading from the other opening to a point in the cylinder near the upper end thereof, the cubical contents of the casing being but a small fraction of that of the cylinder, and valve means inclosed by said casing whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears.

9. In combination, with a fixed hoisting cylinder and a piston and piston rod movable up and down therein, a casing, a pair of meshing pump gears chambered therein, said casing having a continuous passage other than the gear chamber extending from the delivery side of the pump gears to the suction side thereof, said casing also having two openings leading to the passage, passage forming means leading from one of the openings to a point in the cylinder beneath the piston, other passage forming means leading from the other opening to a point in the cylinder near the upper end thereof, the cubical contents of the casing being but a small fraction of that of the cylinder, and valve means inclosed by said casing whereby liquid may be either admitted through one of these openings in such direction as to pass to the suction side of the gears and be discharged through the discharge passage and the other opening, or may be admitted through the last mentioned opening and discharged through the first mentioned opening without passing through the pump gears, or may be circulated continuously through the passage, as desired.

10. A gear pump comprising a block casing, a pair of meshing pump gears chambered therein, a passage other than the gear chamber entirely inclosed within the block casing and extending from the suction side of the pump gears to the delivery side thereof whereby the use of projecting connections is avoided and a compact device is secured, a suction passage in said casing, a delivery passage also in said casing, and a single valve in said first mentioned passage whereby liquid may be admitted through the suction passage to the first named passage and discharged through the delivery passage after passing through the pump gears or may be admitted through the delivery passage and discharged through the suction passage without passing through the gears.

11. A gear pump comprising a block casing, a pair of meshing pump gears chambered therein, a passage other than the gear chamber entirely inclosed within the block casing and extending from the suction side of the pump gears to the delivery side thereof whereby the use of projecting connections is avoided and a compact device is secured, a suction passage in said casing, a delivery passage also in said casing, and a single valve located at the point of connection of one of the two last named passages and the first named passage whereby liquid may be admitted through the suction passage to the first named passage and discharged through the delivery passage after passing through the pump gears, or may be admitted through the delivery passage and discharged through the suction passage without passing through the gears.

12. A device for handling liquid comprising a closed system including a casing, the capacity of the casing being but a small fraction of that of the system as a whole, a pair of meshing pump gears chambered in the casing, a single passage inclosed by the casing and leading from the delivery side of the pump gears to the suction side thereof, said passage having two openings, means for driving the pump gears continuously, and valve means whereby liquid may be either admitted through one of the openings in such direction as to pass to the suction side of the gears and be discharged through the passage and the other opening, or may be admitted through the last mentioned opening and discharged through the first mentioned opening without inducing stress upon the rotating pump gears.

13. In combination, a fixed cylinder and a piston and piston rod slidable therein, a casing, passage forming means for conducting liquid from the casing to the cylinder at one side of the piston, other passage forming means for conducting liquid from a point in the cylinder near the opposite end thereof to the casing, the capacity of the casing being but a small fraction of that of the cylinder, a pair of meshing pump gears chambered in the casing, a single passage leading from the delivery side of the pump gears to the suction side thereof, said passage having two openings, one in communication with the first mentioned passage forming means, the other opening being in communication with the last mentioned passage forming means, means for driving the pump gears continuously, and valve means whereby liquid may be either admitted through one of the openings in such direction as to pass to the suction side of the gears and be discharged through the passage and the other opening, or may be admitted through the last mentioned opening and discharged through the first mentioned opening without inducing stress on the rotating pump gears.

14. A gear pump comprising a block casing, a pair of meshing pump gears chambered therein, a passage other than the gear chamber entirely inclosed within the block casing and extending from the suction side of the pump gears to the delivery side thereof whereby the use of projecting connections is avoided and a compact device is secured, a suction passage in said casing, a delivery passage also in said casing, and a single valve in said first mentioned passage whereby liquid may be admitted through the suction passage to the first named passage and discharged through the delivery passage after passing through the pump gears or may be admitted through the delivery passage and discharged through the suction passage without passing through the gears, said valve and the associated passages being so arranged that the valve is incapable of entirely preventing the escape of liquid from the discharge side of the pump gears.

15. A gear pump comprising a thin block casing, a pair of meshing pump gears chambered therein, a passage other than the gear chamber entirely inclosed within the block casing and extending from the suction side of the pump gears to the delivery side thereof in the plane of said gears whereby the use of projecting connections is avoided and a compact device is secured, a suction passage in said casing, a delivery passage also in said casing, and a single valve located at the point of connection of one of the two last named passages and the first named passage the valve projecting from one side only of the casing and being rotatable about an axis parallel to the axes of the pump gears, whereby liquid may be admitted through the suction passage to the first named passage and discharged through the delivery passage after passing through the pump gears, or may be admitted through the delivery passage and discharged through the suction passage without passing through the gears.

In testimony whereof I sign this specification in the presence of two subscribing witnesses.

GARFIELD A. WOOD.

Witnesses:
L. M. SPENCER,
MURLEN M. WOOD.